Dec. 6, 1955 H. C. VAN HEUKELOM 2,725,766
SINK REAMER

Filed Jan. 23, 1952 2 Sheets-Sheet 1

Henry C. vanHeukelom
INVENTOR.

BY *Clarence A. O'Brien*
*and Harvey B. Jacobson*
Attorneys

Dec. 6, 1955  H. C. VAN HEUKELOM  2,725,766
SINK REAMER
Filed Jan. 23, 1952  2 Sheets-Sheet 2
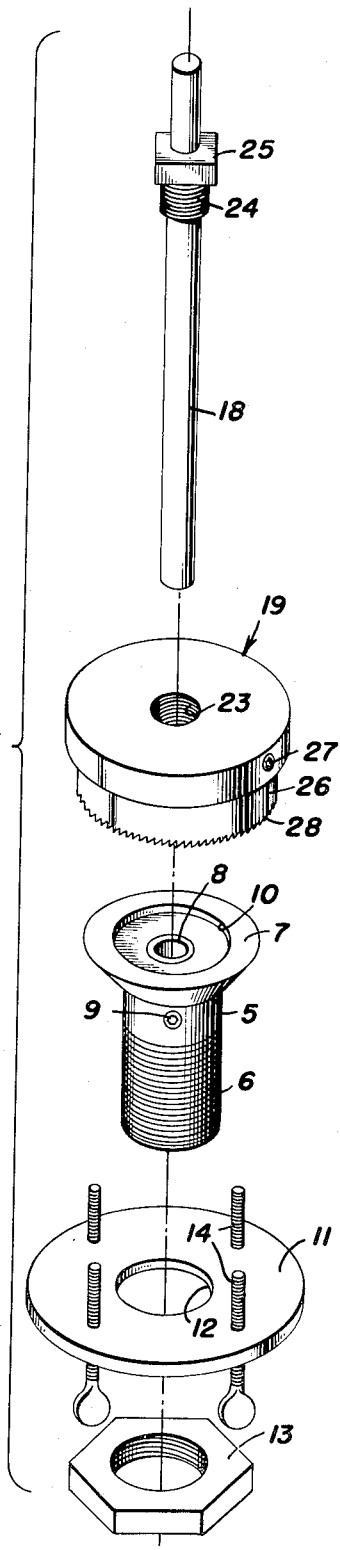
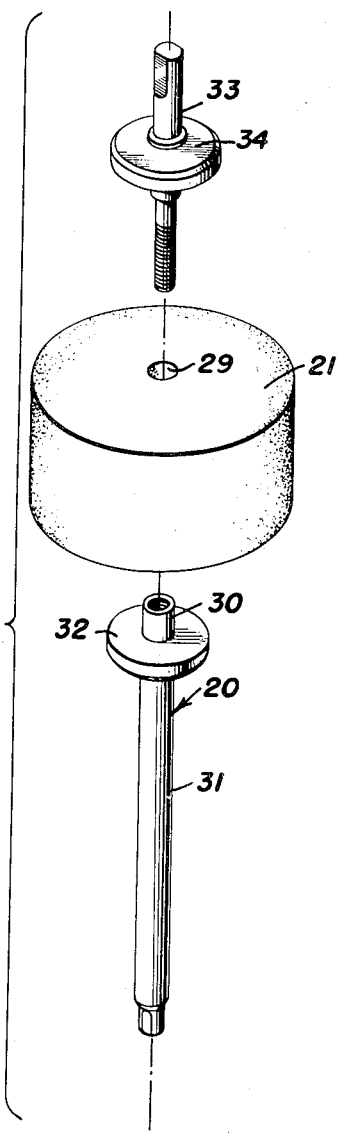
Henry C. vanHeukelom
INVENTOR.
BY Clarence A. O'Brien
and Harvey B. Jacobson
Attorneys United States Patent Office 2,725,766
Patented Dec. 6, 1955

2,725,766

SINK REAMER

Henry C. van Heukelom, Lynwood, Calif.

Application January 23, 1952, Serial No. 267,765

4 Claims. (Cl. 77—2)

The present invention relates to new and useful improvements in sink reamers for equipping the sink with sink strainers, garbage disposers or other sink attachments.

An important object of the invention to provide means for clamping a shaft pilot in the drain opening of a sink to interchangeably receive the shafts of a grinding wheel and rotary saw to cut and ream the drain opening to a size for mounting the flange of a sink attachment therein.

Another object is to provide a reaming and cutting kit of this character of simple and practical construction, which is efficient and reliable in operation, relatively inexpensive to manufacture and otherwise well adapted for the purposes for which the same is intended.

Other objects and advantages reside in the details of construction and operation as more fully hereinafter described and claimed, reference being had to the accompanying drawings forming part hereof, wherein like numerals refer to like parts throughout, and in which:

Figure 3 is a group perspective view of the parts of the rotary saw and pilot; and Figure 4 is a group perspective view of the grinding wheel and shaft therefor.

Figure 1:
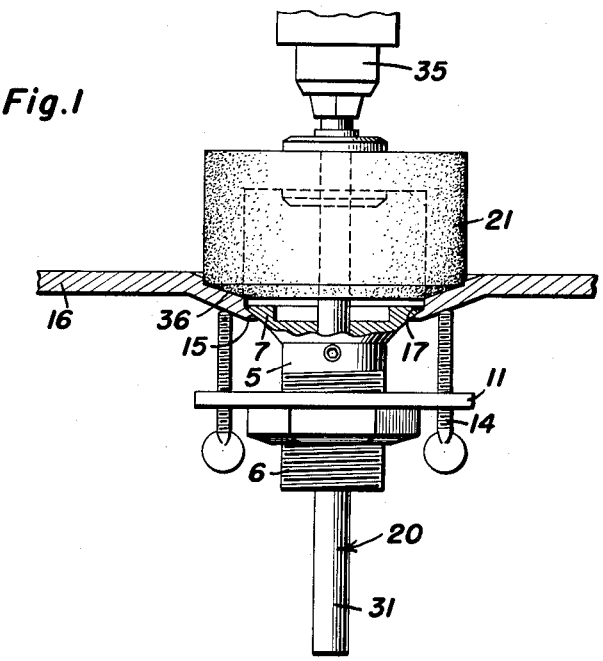
Figure 1 is a side elevational view showing the grinding wheel in position in the drain opening.
Figure 2:
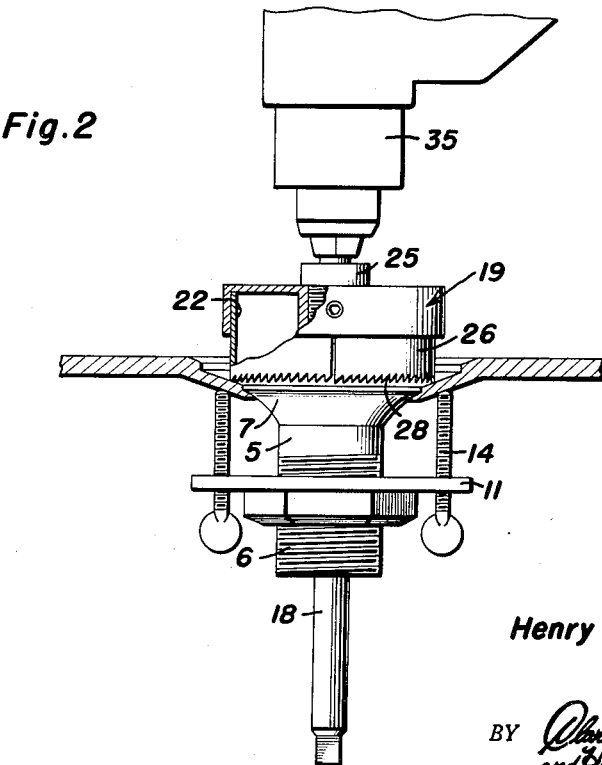
Figure 2 is a similar view showing the rotary saw in use.

Referring now to the drawings in detail, wherein for the purpose of illustration I have disclosed a preferred embodiment of my invention, the numeral 5 designates a shaft pilot having an externally threaded lower end 6 and a flared head 7.

A bushing 8 is locked centrally in the pilot by a set screw 9 and the top of head 7 is formed with a circular recess 10.

A clamping plate 11 is formed with a central opening 12 to receive the pilot 5 on the lower end of which a nut 13 is threaded to hold the plate thereon and to form a stop for the plate. A plurality of thumb screws 14 are threaded upwardly through the plate and by means of which the pilot may be clamped in the drain opening 15 of a sink 16 by placing the flared head 7 in the opening to rest on the flange seat or shoulder 17 therein and with the thumb screws 14 tightened against the underside of the sink. The pilot is then ready to interchangeably receive a shaft 18 for a rotary saw unit designated generally at 19, or a shaft 20 for a grinding wheel 21.

Saw unit 19 comprises a cup 22 having a central threaded bore 23 for threading on a threaded portion 24 of shaft 18, and above which a nut 25 or other wrench engaging formation is suitably fixed or formed with the shaft below its upper end to tighten the shaft in the cup. Cup 22 is inverted and a saw blade 26 is then curved inside the cup 22 and secured therein by a screw or the like 27 to hold the saw in a circular shape with its teeth 28 projecting below the cup.

Grinding wheel 21 is also of inverted cup shape and is formed with a central bore 29 to receive the internally threaded upper end 30 of a lower shaft section 31 of shaft 20 inserted upwardly in the grinding wheel. A flange or stop 32 is formed on lower shaft section 31 to abut the underside of the wheel and an upper shaft section 33 is threaded at its lower end and connected to the upper end of lower shaft section 31. A flange 34 is formed on upper shaft section 33 to clamp against the top of the wheel.

In the operation of the cutting and reaming kit, after the shaft pilot 5 has been secured in the drain opening 15 of the sink, as above explained, the shaft 20 with the grinding wheel 21 secured thereto is placed in the bore of the pilot and the upper end of shaft 20 attached to an electric drill 35. The lower edge of the grinding wheel is bevelled, as shown at 36, whereby the surface of the sink will be reamed deep enough for the sink flange of a conventional type of strainer, garbage disposer or other sink attachment (not shown) to seat flush with the surface of the sink.

The grinding wheel 21 and shaft 20 are then removed and shaft 18 of saw unit 19 placed in the bore of the pilot 5 and attached to the electric drill 35 for cutting the hole in the sink to the desired diameter.

In view of the foregoing description taken in conjunction with the accompanying drawings it is believed that a clear understanding of the device will be quite apparent to those skilled in this art. A more detailed description is accordingly deemed unnecessary.

It is to be understood, however, that even though there is herein shown and described a preferred embodiment of the invention the same is susceptible to certain changes fully comprehended by the spirit of the invention as herein described and the scope of the appended claims.

Having described the invention, what is claimed as new is:

1. A sink reamer comprising a cylindrical shaft pilot having a flared upper end to center the pilot in a sink circular opening, clamping means mounted on the lower end of said pilot for maintaining the flared upper end in its centered position, a shaft freely slidably and rotatably extending through said pilot, a tool mounted on said shaft for engaging a sink surface, the lower end of said pilot being externally threaded, said clamping means including a clamping plate slidably disposed on the lower end of said pilot, a nut threaded on said lower end of said pilot, said clamping plate seating on said nut, and thumb screws threaded in said plate at circumferentially spaced points therearound for engagement with the sink surface.

2. A reaming device guide comprising a shaft pilot having a flared upper end for centering the pilot in a work piece opening by engaging one surface of the work piece adjacent the opening and an externally threaded lower end, a disk concentrically and slidably surrounding said lower end, a nut threaded on said lower end, said disk seating on said nut, thumb screws spaced around said disk for engaging the opposite surface of the work piece relative to said one surface and maintaining the disk in seating engagement with the nut, and a tool carrying shaft freely slidably and rotatably disposed in said pilot.

3. A shaft pilot for guiding a shaft through the center of a circular opening through a work piece, said pilot comprising a cylindrical shank having a longitudinal pilot bore therethrough for guiding a shaft, said shank having a flared upper end adapted to engage one surface of the work piece defining the edge of the opening to center the pilot in the opening, a disk on the lower portion of said shank, means adjustably retaining said disk on the lower portion of said shank, fastening elements adjustably carried by said disk at circumferentially spaced points therearound, said fastening elements being radially spaced from and being disposed parallel to said shank for engaging the surface of the work piece opposite said one surface to retain said flared upper end of said shank in engagement with said one surface.

4. The combination of claim 3 wherein said lower portion of said shank is threaded, said disk slidably disposed on said lower portion, said adjustable retaining means comprising a nut threaded on said shank, said disk being disposed between said flared upper end of said shank and said nut.

References Cited in the file of this patent

UNITED STATES PATENTS

| Number | Name | Date |
|---|---|---|
| 44,296 | Flanders | Sept. 20, 1864 |
| 714,631 | Barnes | Nov. 25, 1902 |
| 1,041,479 | Kaiser | Oct. 15, 1912 |
| 1,064,676 | Winn | June 10, 1913 |
| 1,590,994 | Misener | June 29, 1926 |
| 1,993,844 | Karnath | Mar. 12, 1935 |
| 2,308,472 | Smith | Jan. 12, 1943 |
| 2,360,009 | Norton | Oct. 10, 1944 |
| 2,360,550 | Culp | Oct. 17, 1944 |
| 2,394,882 | Weynand | Feb. 12, 1946 |
| 2,431,369 | Chiles | Nov. 25, 1947 |
| 2,484,150 | Brown | Oct. 11, 1949 |